US012579841B2

(12) United States Patent
Harrison et al.

(10) Patent No.: US 12,579,841 B2
(45) Date of Patent: Mar. 17, 2026

(54) SYSTEMS AND METHODS FOR AUTONOMOUS HORN ACTIVATION AND KIDNAPPING DETECTION

(71) Applicant: TORC Robotics, Inc., Blacksburg, VA (US)

(72) Inventors: Christopher Harrison, Blacksburg, VA (US); Andrew Culhane, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 311 days.

(21) Appl. No.: 18/221,825

(22) Filed: Jul. 13, 2023

(65) Prior Publication Data

US 2025/0022313 A1    Jan. 16, 2025

(51) Int. Cl.
*G06V 40/20* (2022.01)
*B60W 60/00* (2020.01)
(Continued)

(52) U.S. Cl.
CPC .............. *G06V 40/20* (2022.01); *G06V 10/40* (2022.01); *G06V 10/70* (2022.01); *G06V 20/58* (2022.01);
(Continued)

(58) Field of Classification Search
CPC ........ G06V 40/20; G06V 20/59; G06V 20/58; G06V 10/70; G06V 40/10; G06V 10/40; G06V 2201/08; G08B 21/02; B60W 60/00
See application file for complete search history.

(56) References Cited

U.S. PATENT DOCUMENTS 10,272,839 B2    4/2019   Lynam et al.
10,528,837 B1    1/2020   Krishnan
(Continued)

FOREIGN PATENT DOCUMENTS

KR          100935103 B1 *  1/2010   ............. G08B 29/02

OTHER PUBLICATIONS

Ramaraj, Nitish, Girish Murugan, and Rajeshkannan Regunathan. "Neural network-powered conductorless ticketing for public transportation." 2024 4th International Conference on Pervasive Computing and Social Networking (ICPCSN). IEEE, 2024. (Year: 2024).

*Primary Examiner* — Pinalben Patel
(74) *Attorney, Agent, or Firm* — Armstrong Teasdale LLP

(57) ABSTRACT

An autonomous vehicle can include a horn; a sensor(s) configured to capture images; and one or more processors. The one or more processors can be configured to receive a sequence of images from the sensor(s), the sequence of images captured by the sensor(s) as the autonomous vehicle was moving; execute a machine learning model using the sequence of images as input to detect a human inside a second vehicle or in the surrounding environment of the autonomous vehicle depicted within the sequence of images; determine, based on the detection of the human inside the second vehicle or in the surrounding environment of the autonomous vehicle within the sequence of images, the human is depicted performing a defined arm gesture within the sequence of images; and activate the horn responsive to the determination that the human is depicted performing the defined arm gesture within the sequence of images.

20 Claims, 8 Drawing Sheets

(51) Int. Cl.

| | | |
|---|---|---|
| *G06V 10/40* | (2022.01) | |
| *G06V 10/70* | (2022.01) | |
| *G06V 20/58* | (2022.01) | |
| *G06V 20/59* | (2022.01) | |
| *G06V 40/10* | (2022.01) | |
| *G08B 21/02* | (2006.01) | |

(52) U.S. Cl.
CPC .............. *G06V 20/59* (2022.01); *G06V 40/10* (2022.01); *G08B 21/02* (2013.01); *B60W 60/00* (2020.02); *G06V 2201/08* (2022.01)

(56) References Cited

U.S. PATENT DOCUMENTS

| | | | |
|---|---|---|---|
| 2016/0167648 A1 | 6/2016 | James et al. | |
| 2019/0188493 A1* | 6/2019 | Tiziani | ................... H04H 20/59 |
| 2019/0333381 A1* | 10/2019 | Shalev-Shwartz | ... G06V 20/584 |
| 2021/0269045 A1* | 9/2021 | Katz | ................. G02B 27/0093 |
| 2021/0380099 A1 | 12/2021 | Lee et al. | |
| 2022/0130155 A1* | 4/2022 | Herbst | ...................... G06T 7/20 |
| 2023/0066101 A1* | 3/2023 | Shao | ...................... B64U 10/13 |

\* cited by examiner

622

SYSTEMS AND METHODS FOR AUTONOMOUS HORN ACTIVATION AND KIDNAPPING DETECTION

TECHNICAL FIELD

The present disclosure relates generally to autonomous vehicles and, more specifically, to systems and methods for improving autonomous vehicle road citizenship with automatic horn activation and kidnapping detection.

BACKGROUND

Part of being a good citizen of the road is showing appreciation or acknowledgment to other external actors (e.g., other vehicles and people). For example, a human may see a semi-truck and perform a gesture which the driver of the vehicle should react to. A driver of the semi-truck may see the gesture and honk the horn of the semi-truck. In another example, a semi-truck driver may report suspected kidnapping victims based on actions of the suspected kidnapping victims. Autonomous vehicles may not be able to perform the same or similar actions to be good citizens of the road despite autonomous vehicles being able to evaluate situations objectively and not based on feelings to ensure incidents are reported.

SUMMARY

An automated (e.g., autonomous) vehicle system may not be able to follow the same citizenship rules on the road as humans. For example, part of being a good citizen of the road, whether the actor is human or robotic, is acknowledging other humans or vehicles that share the road. For example, it may be common for a passenger of a vehicle adjacent to a semi-truck to express basic comradery with the semi-truck by motioning for the truck to honk (or otherwise activate) a horn. People could similarly perform such movements when outside of a vehicle, such as when they are standing outside of the vehicle adjacent to the semi-truck, on a bridge, at the launch of a vehicle at a hub, etc. Truck drivers may respond to such motions by honking the horns of the trucks the truck drivers are driving. However, self-driving vehicles (e.g., autonomous vehicles), such as trucks or other vehicles, may have difficulties recognizing and/or reacting to the same gestures. The lack of a response or appreciation of such motions may result in upset drivers on the road, which may cause reduced occurrence of these scenarios and an overall reduced experience interacting with autonomous vehicles.

A computer of an autonomous vehicle implementing the systems and methods described herein may overcome the aforementioned technical deficiencies. For example, the computer may use machine learning techniques to monitor the environment surrounding the autonomous vehicle. The computer can analyze (e.g., using machine learning) images captured or generated by a sensor(s) of the autonomous vehicle to determine images or sequences of images (e.g., consecutively received images generated by the same sensor(s) or time stamped together) that contain humans inside vehicles (e.g., in the passenger seat, driver's seat, or the backseats of vehicles) and/or in the environment surrounding the autonomous vehicle. The computer can analyze any motions of a human inside a second vehicle or in the environment surrounding the autonomous vehicle depicted within a sequence of images. The computer can determine the human is performing a defined arm gesture within the sequence of images from the analysis. Based on the determination, the computer can determine to activate an acknowledgment sequence, such as by honking a horn of the autonomous vehicle. In doing so, the computer can express appreciation or acknowledgment to the human actor performing the defined arm gesture.

The techniques described herein may result in various advantages over the aforementioned technical deficiencies. For example, adopting the acknowledgment procedure may allow for improved interactions with external actors (e.g., other actors on the road) by showing appreciation, improved social acceptance of autonomous vehicles, and improved "behavior" of autonomous vehicles by following common roadway practice.

Autonomous vehicles may have difficulties performing citizenship roles on the road that are typically performed by human drivers. For example, one role that human drivers may play is identifying and/or reporting humans that appear to be kidnapping victims. Human drivers may analyze the actions of individuals that are on the road, such as passengers of vehicles, and report any activity that the human drivers determine to be suspicious. In contrast, autonomous vehicles may only focus on driving on the road according to a set of driving rules and regulations. Accordingly, autonomous vehicles may not be able to identify potential kidnapping victims on the road.

A computer of an autonomous vehicle implementing the systems and methods described herein may overcome the aforementioned technical deficiencies. For example, the computer may use machine learning techniques to monitor the environment surrounding the autonomous vehicle. The computer can analyze images captured by a sensor of the autonomous vehicle to determine images or sequences of images that contain humans inside other vehicles. The computer can analyze any motions of a human inside a second vehicle depicted within a sequence of images. The computer can determine the human is performing a distressed action within the sequence of images. Based on the determination, the computer can determine to activate a distress response protocol, such as by transmitting a message to a remote computing device (e.g., a computing device associated with the authorities, such as the police or a fire station) that indicates the location of the autonomous vehicle or the second vehicle. In doing so, the computer can automatically identify potential kidnapping victims and alert authorities accordingly.

One problem that a computer may face when identifying potential kidnapping victims is false positives. For example, a computer may identify potential kidnapping victims from images of the potential kidnapping victims in the passenger seat or backseat of another vehicle. The computer can analyze the gestures or motions of the potential kidnapping victims and determine the passengers are potential kidnapping victims based on the gestures or motions. However, the body language of the potential victims may be blocked from view in the images or the gestures may be gestures that people may perform for other reasons, such as a kid flailing around in the back seat of a vehicle. The computer may not be able to differentiate between distressed actions of individuals and gestures that are performed for other reasons, which could result in the computer reporting innocent vehicles and for any such reports of the computer to lose credibility.

To reduce the false positive problem, a computer may only analyze images to detect a kidnapping victim in response to identifying a vehicle within the images with vehicle characteristics that match the vehicle characteristics of an alert (e.g., amber alerts or silver alerts). For example, the computer can communicate with a remote computer or server to receive or retrieve alerts. The alerts may each indicate one or more vehicle characteristics (e.g., make, year, model, color, license plate number, another vehicle identifier, etc.) of a vehicle and an identifier of a missing person that corresponds to the alert. The computer can use machine learning techniques to scan images or sequences of images for vehicles that have the vehicle characteristics of the alerts. Responsive to detecting a sequence of images that includes a vehicle with vehicle characteristics that match vehicle characteristics of a vehicle of an alert, the computer can determine (e.g., using machine learning techniques) whether a passenger in the vehicle (e.g., within the backseat, the passenger seat, or the driver's seat of the vehicle) is performing a distressed action. The computer can transmit a message to a remote computing device responsive to deter-mining the passenger is performing the distressed action.

In at least one aspect, the present disclosure describes an autonomous vehicle. The autonomous vehicle can include a horn; a sensor configured to capture images; and one or more processors. The one or more processors can be configured to receive a sequence of images from the sensor(s), the sequence of images captured by the sensor(s) as the autono-mous vehicle was moving; execute a machine learning model using the sequence of images as input to detect a human inside a second vehicle or in the surrounding envi-ronment of the autonomous vehicle depicted within the sequence of images; determine, based on the detection of the human inside the second vehicle within the sequence of images, the human is depicted performing a defined arm gesture (e.g., a horn honking gesture) within the sequence of images; and activate the horn responsive to the determina-tion that the human is depicted performing the defined arm gesture within the sequence of images.

In another aspect, the present disclosure describes a method. The method can include receiving, by one or more processors of an autonomous vehicle from a sensor(s) of the autonomous vehicle, the sequence of images captured by the sensor(s) as the autonomous vehicle was moving; executing, by the one or more processors, a machine learning model using the sequence of images as input to detect a human inside a second vehicle or in the surrounding environment of the autonomous vehicle depicted within the sequence of images; determining, by the one or more processors and based on the based on the detection of the human inside the second vehicle within the sequence of images, the human is depicted performing a defined arm gesture within the sequence of images; and activating, by the one or more processors, a horn responsive to the determining that the human is depicted performing the defined arm gesture within the sequence of images.

In at least one aspect, the present disclosure describes an autonomous vehicle. The autonomous vehicle can include a sensor configured to capture images; and one or more processors configured to detect an alert indicating one or more vehicle characteristics; receive a sequence of images from the sensor; determine a second vehicle depicted within the sequence of images has the one or more vehicle char-acteristics; responsive to the determination that the second vehicle depicted within the sequence of images has the one or more vehicle characteristics, execute a machine learning model using the sequence of images as input to determine a human inside the second vehicle or in the surrounding environment of the second vehicle is performing a distressed action; and activate a distress response protocol responsive to the determination that the human inside the second vehicle or in the surrounding environment of the autono-mous vehicle is performing the distressed action.

In another aspect, the present disclosure describes a method. The method can include detecting, by one or more processors of an autonomous vehicle, an alert indicating one or more vehicle characteristics; receiving, by the one or more processors of the autonomous vehicle from a sensor of the autonomous vehicle, a sequence of images from the sensor; determining, by the one or more processors, a second vehicle depicted within the sequence of images has the one or more vehicle characteristics; responsive to the determin-ing that the second vehicle depicted within the sequence of images has the one or more vehicle characteristics, execut-ing, by the one or more processors, a machine learning model using the sequence of images as input to determine a human inside the second vehicle or in the surrounding environment of the second vehicle is performing a distressed action; and activating, by the one or more processors, a distress response protocol responsive to the determining that the human inside the second vehicle or in the surrounding environment of the autonomous vehicle is performing the distressed action.

BRIEF DESCRIPTION OF THE DRAWINGS

The accompanying drawings, which are incorporated in and constitute a part of this specification, illustrate various exemplary embodiments and together with the description, serve to explain the principles of the disclosed embodi-ments.

DETAILED DESCRIPTION

The following detailed description describes various fea-tures and functions of the disclosed systems and methods with reference to the accompanying figures. In the figures, similar components are identified using similar symbols, unless otherwise contextually dictated. The exemplary sys-tem(s) and method(s) described herein are not limiting and it may be readily understood that certain aspects of the disclosed systems and methods can be variously arranged and combined, all of which arrangements and combinations are contemplated by this disclosure.

Figure 1:
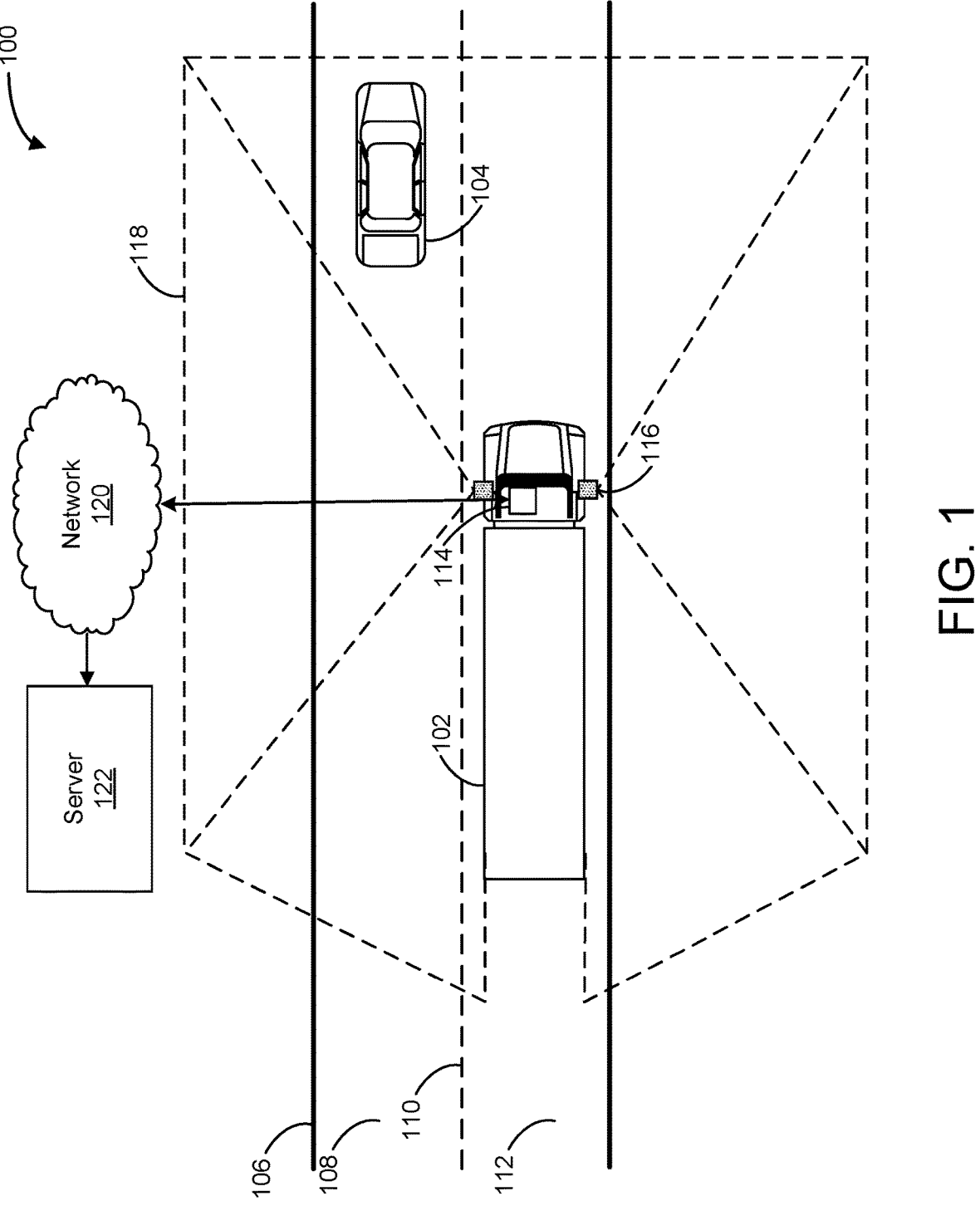
FIG. 1 is a bird's-eye view of a roadway including a schematic representation of a vehicle and aspects of an autonomy system of the vehicle, according to an embodi-ment.

Referring to FIG. 1, the present disclosure relates to autonomous vehicles, such as an autonomous vehicle 102 having an autonomy system 114. The autonomy system 114 of the vehicle 102 may be completely autonomous (fully autonomous), such as self-driving, driverless, or Level 4 autonomy, or semi-autonomous, such as Level 3 autonomy. As used herein the term "autonomous" includes both fully autonomous and semi-autonomous. The present disclosure sometimes refers to autonomous vehicles as ego vehicles. The autonomy system 114 may be structured on at least three aspects of technology: (1) perception, (2) maps/localization, and (3) behaviors planning and control. The function of the perception aspect is to sense an environment surrounding the vehicle 102 and interpret the environment. To interpret the surrounding environment, a perception module 116 or engine in the autonomy system 114 of the vehicle 102 may identify and classify objects or groups of objects in the environment. For example, a perception module 116 may be associated with various sensors (e.g., light detection and ranging (LiDAR), camera, radar, etc.) of the autonomy system 114 and may identify one or more objects (e.g., pedestrians, vehicles, debris, etc.) and features of the roadway (e.g., lane lines) around the vehicle 102, and classify the objects in the road distinctly.

The maps/localization aspect of the autonomy system 114 may be configured to determine where on a pre-established digital map the vehicle 102 is currently located. One way to do this is to sense the environment surrounding the vehicle 102 (e.g., via the perception module 116), such as by detecting vehicles (e.g., a vehicle 104) or other objects (e.g., traffic lights, speed limit signs, pedestrians, signs, road markers, etc.) from data collected via the sensors of the autonomy system 114, and to correlate features of the sensed environment with details (e.g., digital representations of the features of the sensed environment) on the digital map.

Once the systems on the vehicle 102 have determined the location of the vehicle 102 with respect to the digital map features (e.g., location on the roadway, upcoming intersections, road signs, etc.), the vehicle 102 can plan and execute maneuvers and/or routes with respect to the features of the digital map. The behaviors, planning, and control aspects of the autonomy system 114 may be configured to make decisions about how the vehicle 102 should move through the environment to get to the goal or destination of the vehicle 102. The autonomy system 114 may consume information from the perception and maps/localization modules to know where the vehicle 102 is relative to the surrounding environment and what other objects and traffic actors are doing.

FIG. 1 further illustrates an environment 100 for modifying one or more actions of the vehicle 102 using the autonomy system 114. The vehicle 102 is capable of communicatively coupling to a remote server 122 via a network 120. The vehicle 102 may not necessarily connect with the network 120 or the server 122 while it is in operation (e.g., driving down the roadway). That is, the server 122 may be remote from the vehicle, and the vehicle 102 may deploy with all the necessary perception, localization, and vehicle control software and data necessary to complete the vehicle 102's mission fully autonomously or semi-autonomously.

While this disclosure refers to a vehicle 102 as the autonomous vehicle, it is understood that the vehicle 102 could be any type of vehicle including a truck (e.g., a tractor trailer), an automobile, a mobile industrial machine, etc. While the disclosure will discuss a self-driving or driverless autonomous system, it is understood that the autonomous system could alternatively be semi-autonomous having varying degrees of autonomy or autonomous functionality or not be autonomous at all. While the perception module 116 is depicted as being located at the front of the vehicle 102, the perception module 116 may be a part of a perception system with various sensors placed at different locations throughout the vehicle 102.

Figure 2:
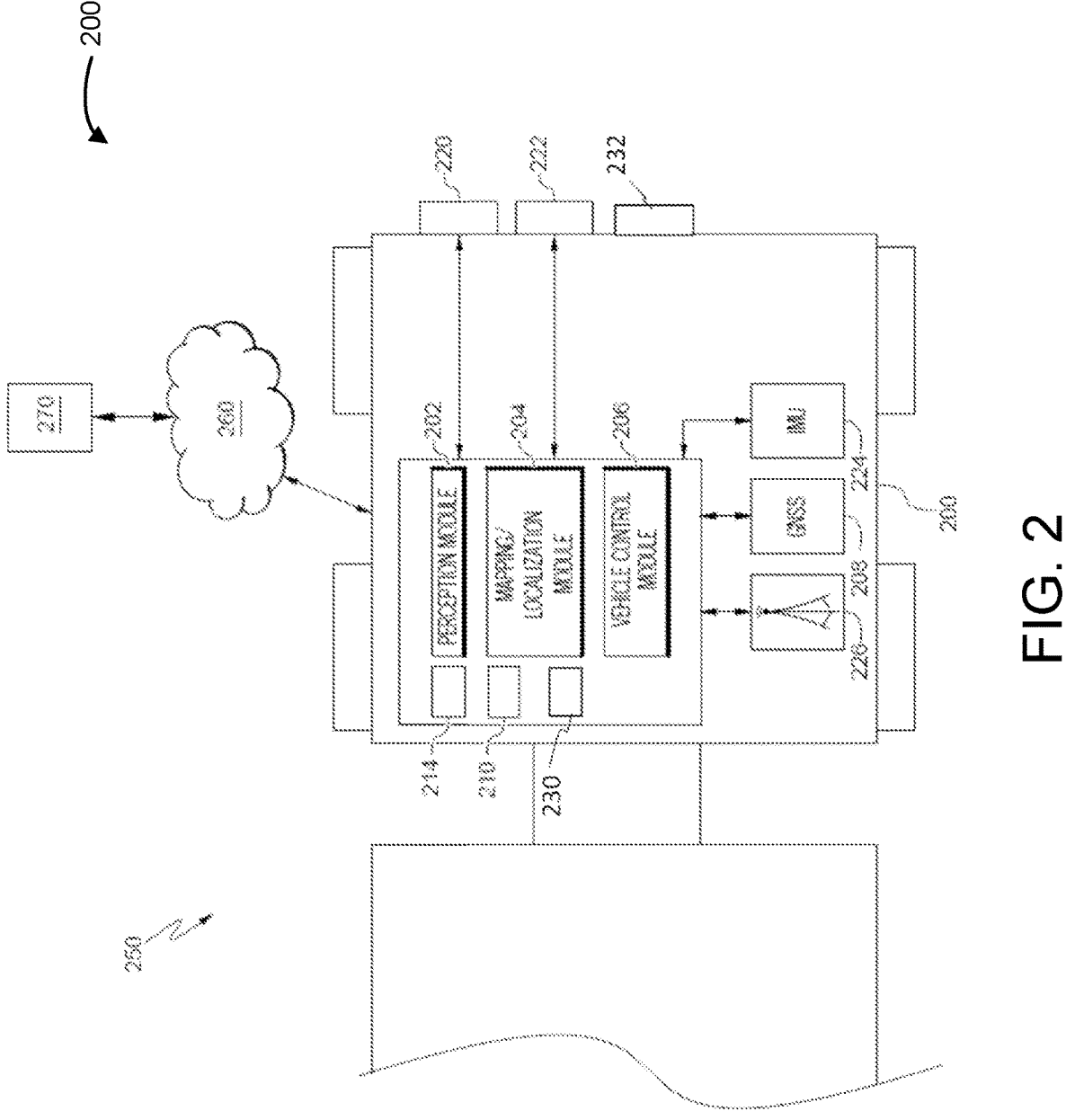
FIG. 2 is a system for detecting human motion in a surrounding environment, according to an embodiment.

FIG. 2 illustrates an example schematic of an autonomy system 250 of a vehicle 200, according to some embodiments. The autonomy system 250 may be the same as or similar to the autonomy system 114. The vehicle 200 may be the same as or similar to the vehicle 102. The autonomy system 250 may include a perception system including a camera system 220, a light detection and ranging (LiDAR) system 222, a radar system 232, a sensor 234, a Global Navigation Satellite System (GNSS) receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As shown in FIG. 1, the perception systems aboard the autonomous vehicle may help the vehicle 102 perceive the vehicle 102's environment out to a perception area 118. The actions of the vehicle 102 may depend on the extent of the perception area 118. It is to be understood that the perception area 118 is an example area, and the practical area may be greater than or less than what is depicted.

The camera system 220 of the perception system may include one or more cameras mounted at any location on the vehicle 102, which may be configured to capture images of the environment surrounding the vehicle 102 in any aspect or field of view (FOV). The FOV can have any angle or aspect such that images of the areas ahead of, to the side, and behind the vehicle 102 may be captured. In some embodiments, the FOV may be limited to particular areas around the vehicle 102 (e.g., forward of the vehicle 102) or may surround 360 degrees of the vehicle 102. In some embodiments, the image data generated by the camera system(s) 220 may be sent to the perception module 202 and stored, for example, in memory 214.

The LiDAR system 222 may include a laser generator and a detector and can send and receive LiDAR signals. A LiDAR signal can be emitted to and received from any direction such that LiDAR point clouds (or "LiDAR images") of the areas ahead of, to the side, and behind the vehicle 200 can be captured and stored as LiDAR point clouds. In some embodiments, the vehicle 200 may include multiple LiDAR systems and point cloud data from the multiple systems may be stitched together.

The radar system 232 may estimate strength or effective mass of an object, as objects made out of paper or plastic may be weakly detected. The radar system 232 may be based on 24 GHZ, 77 GHZ, or other frequency radio waves. The radar system 232 may include short-range radar (SRR), mid-range radar (MRR), or long-range radar (LRR). One or more sensors may emit radio waves, and a processor may process received reflected data (e.g., raw radar sensor data) from the emitted radio waves.

In some embodiments, inputs from the camera system 220, the LiDAR system 222, and the radar system 232 may be fused (e.g., in the perception module 202). The LiDAR system 222 may include one or more actuators to modify a position and/or orientation of the LiDAR system 222 or components thereof. The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the vehicle 200 (or object(s) therein). In some embodiments, the point cloud may be rendered as one or more polygon(s) or mesh model(s) through, for example, surface reconstruction. Collectively, the radar system 232, the LiDAR system 222, and the camera system 220 may be referred to herein as "imaging systems."

The GNSS receiver 208 may be positioned on the vehicle 200 and may be configured to determine a location of the vehicle 200 via GNSS data, as described herein. The GNSS receiver 208 may be configured to receive one or more signals from a global navigation satellite system (GNSS) (e.g., a GPS) to localize the vehicle 200 via geolocation. The GNSS receiver 208 may provide an input to and otherwise communicate with the mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the vehicle 200. For example, the IMU 224 may measure a velocity, acceleration, angular rate, and/or an orientation of the vehicle 200 or one or more of the vehicle 200's individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the vehicle 200 and predict a location of the vehicle 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.). In some embodiments, the transceiver 226 may be configured to communicate with external network(s) via a wired connection, such as, for example, during initial installation, testing, or service of the autonomy system 250 of the vehicle 200. A wired/wireless connection may be used to download and install various lines of code in the form of digital files (e.g., HD digital maps), executable programs (e.g., navigation programs), and other computer-readable code that may be used by the system 250 to navigate the vehicle 200 or otherwise operate the vehicle 200, either fully autonomously or semi-autonomously.

The remote server 270 can be configured to store a database with different alerts. The alerts can be amber alerts that indicate that different individuals are missing. In one example, the database can include one or more entries that each correspond to a different individual. Each entry can include an identification of a missing individual and a location in which the missing individual was last seen. In some cases, one or more of the entries can include one or more characteristics of a vehicle (e.g., make, year, model, color, license plate number, another vehicle identifier, etc.) that the individual was last seen in or near, etc.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. The autonomy system 250 may include a single processor or microprocessor or multiple processor or microprocessors that may include means for controlling the vehicle 200 to switch lanes and monitoring and detecting other vehicles. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote to the vehicle 200. Various other known circuits may be associated with the autonomy system 250, including signal-conditioning circuitry, communication circuitry, actuation circuitry, and other appropriate circuitry.

Figure 3:
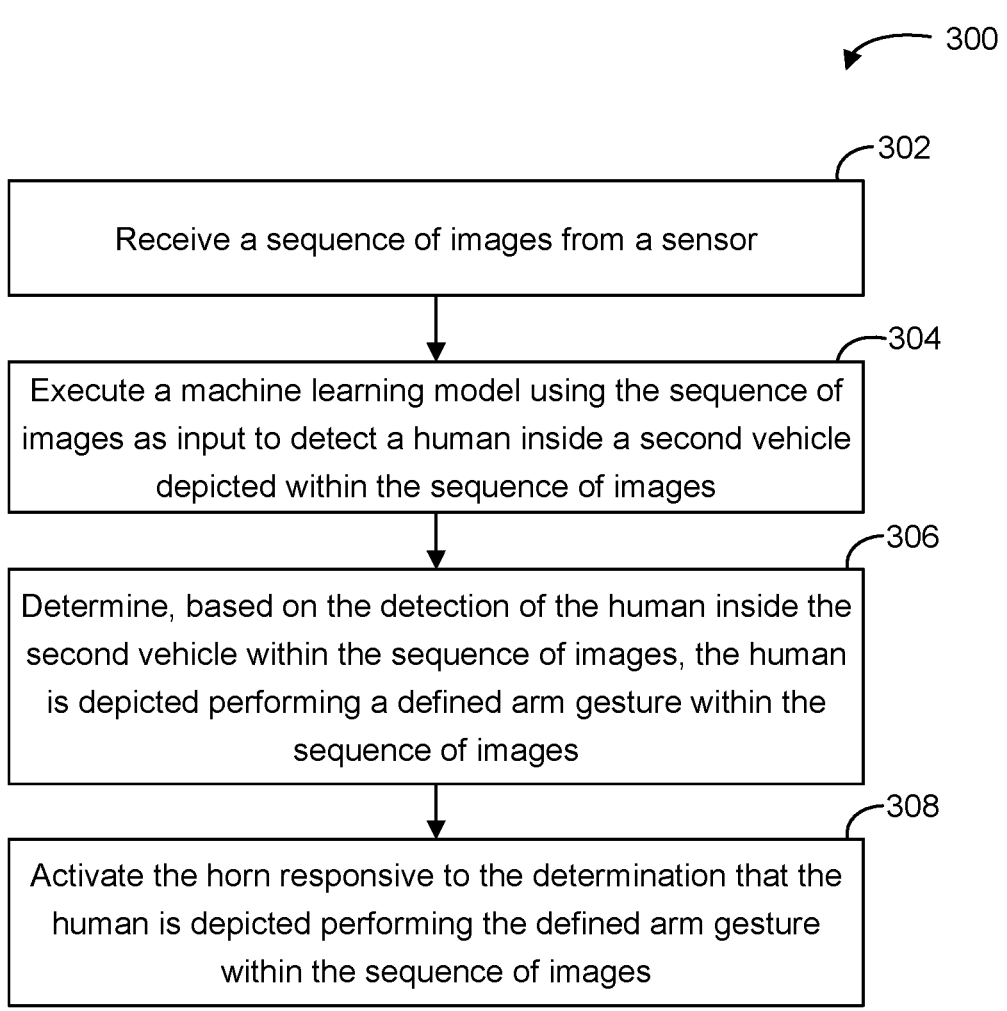
FIG. 3 is a method for autonomous horn activation, according to an embodiment.
Figure 5:
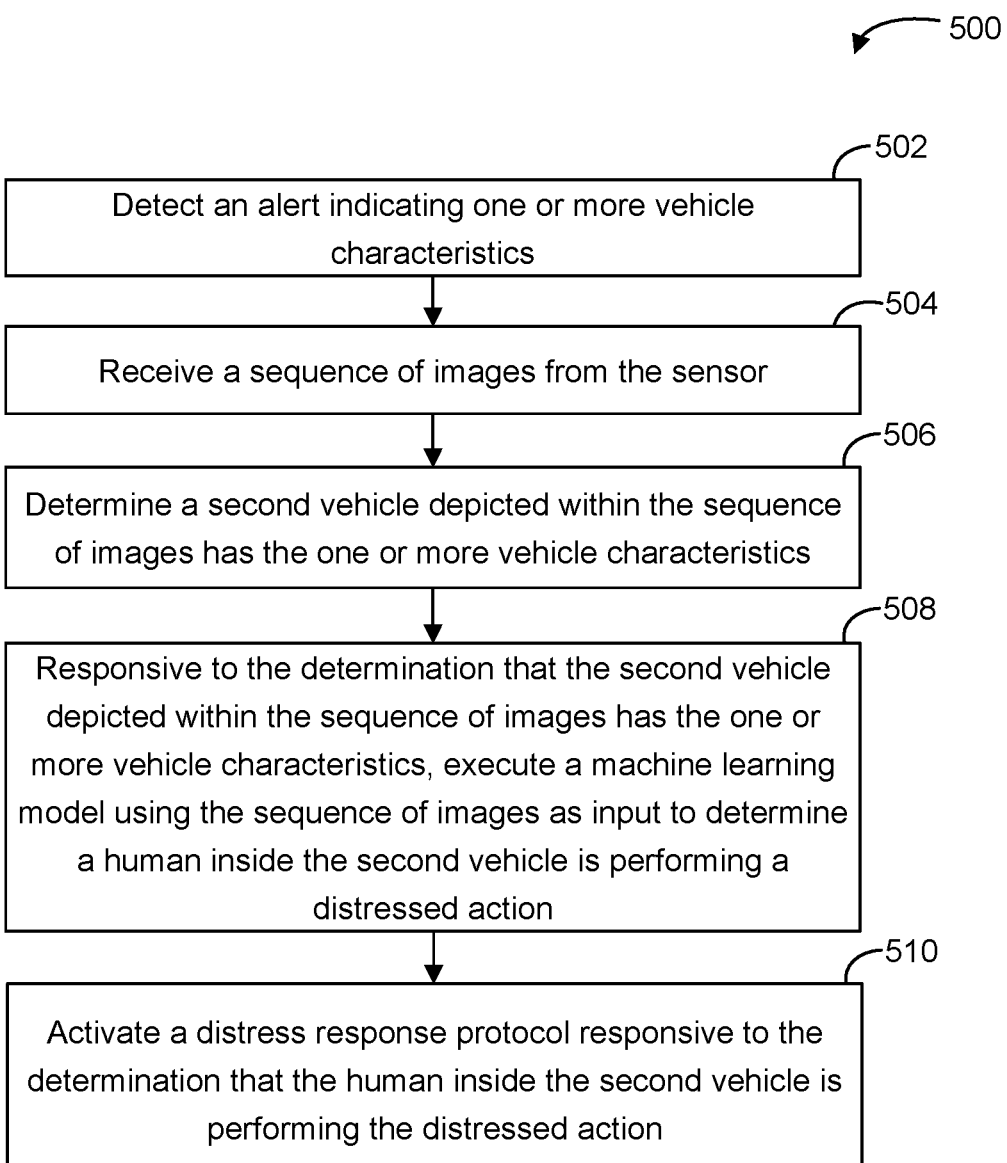
FIG. 5 is a method for detecting a kidnapping scenario, according to an embodiment.

The memory 214 of the autonomy system 250 may store data and/or software routines that may assist the autonomy system 250 in performing autonomy system 250's functions, such as the functions of the perception module 202, the mapping/localization module 204, the vehicle control module 206, an action determination module 230, and the method 300 described herein with respect to FIG. 3 or the method 500 described herein with respect to FIG. 5. Further, the memory 214 may also store data received from various inputs associated with the autonomy system 250, such as perception data from the perception system.

As noted above, the perception module 202 may receive inputs from the various sensors, such as the camera system 220, the LiDAR system 222, the GNSS receiver 208, and/or the IMU 224 (collectively "perception data") to sense an environment surrounding the vehicle 200 and interpret it. To interpret the surrounding environment, the perception module 202 (or "perception engine") may identify and classify objects or groups of objects in the environment. For example, the vehicle 102 may use the perception module 202 to identify one or more objects (e.g., pedestrians, vehicles, debris, etc.) or features of the roadway 106 (e.g., intersections, road signs, lane lines, etc.) before or beside a vehicle and classify the objects in the road. In some embodiments, the perception module 202 may include an image classification function and/or a computer vision function.

The system 250 may collect perception data. The perception data may represent the perceived environment surrounding the vehicle, for example, and may be collected using aspects of the perception system described herein. The perception data can come from, for example, one or more of the LiDAR system, the camera system, the radar system and various other externally-facing sensors and systems on board the vehicle (e.g., the GNSS receiver, etc.). For example, in vehicles having a sonar or radar system, the sonar and/or radar systems may collect perception data. As the vehicle 102 travels along the roadway 106, the system 250 may continually receive data from the various systems on the vehicle 102. In some embodiments, the system 250 may receive data periodically and/or continuously. With respect to FIG. 1, the vehicle 102 may collect perception data that indicates the presence of the lane line 110 (e.g., in order to determine the lanes 108 and 112). Additionally, the detection systems may detect the vehicle 104 and monitor the vehicle 104 to estimate various properties of the vehicle 104 (e.g., proximity, speed, behavior, flashing light, etc.). The properties of the vehicle 104 may be stored as timeseries data in which timestamps indicate the times in which the different properties were measured or determined. The features may be stored as points (e.g., vehicles, signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 250 interacts with the various features.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., the LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the vehicle 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of the vehicle 200's motion, size, etc.).

The mapping/localization module 204 receives perception data that can be compared to one or more digital maps stored in the mapping/localization module 204 to determine where the vehicle 200 is in the world and/or where the vehicle 200 is on the digital map(s). In particular, the mapping/localization module 204 may receive perception data from the perception module 202 and/or from the various sensors sensing the environment surrounding the vehicle 200 and correlate features of the sensed environment with details (e.g., digital representations of the features of the sensed environment) on the one or more digital maps. The digital map may have various levels of detail and can be, for example, a raster map, a vector map, etc. The digital maps may be stored locally on the vehicle 200 and/or stored and accessed remotely.

The vehicle control module 206 may control the behavior and maneuvers of the vehicle 200. For example, once the systems on the vehicle 200 have determined the vehicle 200's location with respect to map features (e.g., intersections, road signs, lane lines, etc.) the vehicle 200 may use the vehicle control module 206 and the vehicle 200's associated systems to plan and execute maneuvers and/or routes with respect to the features of the environment. The vehicle control module 206 may make decisions about how the vehicle 200 will move through the environment to get to the vehicle 200's goal or destination as it completes the vehicle 200's mission. The vehicle control module 206 may consume information from the perception module 202 and the mapping/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the vehicle 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the vehicle 200. The steering system may be any combination of mechanisms configured to adjust the heading or direction of the vehicle 200. The brake system may be, for example, any combination of mechanisms configured to decelerate the vehicle 200 (e.g., friction braking system, regenerative braking system, etc.). The vehicle control module 206 may be configured to avoid obstacles in the environment surrounding the vehicle 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller for vehicle lateral motion control and a propulsion and braking controller for vehicle longitudinal motion.

The action determination module 230 may analyze images or sequences of images (e.g., a plurality of consecutively received images from a single camera or a video or video segment) to determine whether humans within another vehicle on the road are performing defined actions. In one example, the action determination module 230 can determine whether humans located in the other vehicles or in the surrounding environment are performing a defined arm gesture. The defined arm gesture can be a human moving an arm up and down in a defined pattern. The defined pattern can include or be raising and extending an arm up in the air, bending the arm's elbow, and bringing the forearm of the arm down in a vertical motion, for example. The defined pattern can be any pattern that corresponds to honking a truck's horn. The action determination module 230 can execute a machine learning model (e.g., a neural network, a support vector machine, a random forest, etc.) using a sequence of images as input. The machine learning model can be a passenger detection machine learning model or a first machine learning model. Executing the passenger detection machine learning model may cause the passenger detection machine learning model to output an indication that a human inside a second vehicle (e.g., a vehicle different from the vehicle 200 in which the action determination module 230 is located) or in the surrounding environment is depicted within the sequence of images. The action determination module 230 can determine whether the human is performing a defined arm gesture within the sequence of images (e.g., the same sequence from which the action determination module 230 detected the human). Responsive to determining the human is performing the defined arm gesture within the sequence of images, the action determination module 230 can activate (or transmit a signal to the vehicle control module 206 to cause the vehicle control module 206 to activate) an acknowledgment sequence, such as activating a horn (or other audio) of the vehicle 200 (e.g., honk the vehicle 200's horn).

The action determination module 230 can determine whether the human in the second vehicle or in the surrounding environment is performing the defined arm gesture based on the execution of the passenger detection machine learning model using the sequence of images as input. For example, in executing the passenger detection machine learning model using the sequence of images as input, the action determination module 230 may cause the passenger detection machine learning model to output an indication that the human inside the second vehicle or in the surrounding environment is performing the defined action. The passenger detection machine learning model may output the indication that the human inside the second vehicle is performing the defined arm gesture in addition to the indication that the human inside the second vehicle is detected. In some cases, the output from the passenger detection machine learning model that the human inside the second vehicle is performing the defined arm gesture may be the same indication that the action determination module 230 uses to determine the human is inside the second vehicle (e.g., the passenger detection machine learning model only outputs a single indication of whether a sequence of images depicts a human inside another vehicle performing a defined arm gesture or not) or in the surrounding environment.

In some cases, the action determination module 230 may use a series of separately trained machine learning models to determine whether the human in the second vehicle is performing the defined arm gesture. For example, the action determination module 230 can execute a passenger detection machine learning model using the sequence of images as input to determine a human is depicted inside the second vehicle or in the surrounding environment in the sequence of images. Responsive to determining the sequence of images depicts the human inside the second vehicle or in the surrounding environment, the action determination module 230 can execute a gesture detection machine learning model (e.g., a second machine learning model) that is trained to determine whether humans are depicted performing the defined arm gesture. The gesture detection machine learning model can be or include a neural network, a support vector machine, a random forest, etc. The action determination module 230 can execute the gesture detection machine learning model using the sequence of images as input. The gesture detection learning model may output an indication that the human is depicted performing the defined arm gesture within the sequence of images. The action determination module 230 can identify the indication that the human is depicted performing the defined arm gesture output by the gesture detection machine learning model to determine the human is depicted within the sequence of images performing the defined arm gesture.

The passenger detection machine learning model may be trained to only identify humans that are depicted as passengers in vehicles (e.g., only depicted in passengers in defined locations of vehicles, such as in the backseat, the passenger seat, or the driver's seat) in images or sequences of images, only identify humans that are depicted on the side of the road (e.g., pedestrians) in images or sequences of images, or identify any humans that are depicted in images or sequences of images. The action determination module 230 can determine whether such humans are depicted performing the defined arm gesture in the images or sequences. The action determination module 230 may activate the horn of the vehicle 200 or perform another acknowledgment sequence. The action determination module 230 can do so based on or responsive to determining that a human performing the defined arm gesture is depicted in one or more images or a sequence of images.

In another example, the action determination module 230 can use object detection techniques on images to automatically detect or determine potential kidnapping victims (e.g., potential kidnapping victims in other vehicles). For instance, the action determination module 230 can receive a sequence of images from a camera of the camera system 220. The action determination module 230 can input the sequence of images into a machine learning model (e.g., a neural network, a support vector machine, a random forest, etc.) that is trained to identify passengers of vehicles performing distressed actions. The machine learning model may be a kidnapping detection machine learning model. Based on the input sequence of images, the kidnapping detection machine learning model may output an indication as to whether the sequence of images depicts a human in a second vehicle (e.g., a different vehicle from the vehicle 200) performing a distressed action. Responsive to the kidnapping detection machine learning model outputting an indication that a human in a second vehicle is performing a distressed action, the action determination module 230 can determine the human in the other vehicle is performing the distressed action. The action determination module 230 can activate a distress response protocol responsive to determining the human in the second vehicle is performing the distressed action.

The kidnapping detection machine learning model may be trained to only identify humans performing distressed actions that are depicted as passengers in vehicles (e.g., as passengers in defined locations of vehicles, such as in the backseat, the passenger seat, or the driver's seat) in images or sequences of images, only identify humans performing distressed actions that are depicted on the side of the road (e.g., pedestrians) in images or sequences of images, or identify any humans performing distressed actions that are depicted in images or sequences of images. The action determination module 230 can determine whether such humans are depicted performing the distressed action in the images or sequences. Responsive to determining a sequence of images depicts a human performing the distressed action, the action determination module 230 may activate the distress response protocol.

The distressed action can correspond to an action associated with a kidnapped individual. For example, a distressed action can be a human waving their arms in the air or otherwise attempting to fight back against someone that is in the act of kidnapping the human or that has already kidnapped the human. The kidnapping detection machine learning model may be trained to recognize such distressed actions using training images that depict different humans being kidnapped. Such training images can be captured, for example, when simulating situations in which a human is being kidnapped. In some cases, the kidnapping detection machine learning model can be trained to identify distressed actions or a kidnapper attempting to kidnap an individual.

In some cases, the action determination module 230 may only execute the kidnapping detection machine learning model to determine whether a human in the second vehicle is performing a distressed action responsive to determining the second vehicle corresponds to an alert, such as an Amber Alert. For example, the action determination module 230 may query the remote server 270. The action determination module 230 can query the remote server 270 for any alerts that are stored at the remote server 270. In querying the remote server 270, the action determination module 230 can transmit an identification of the current location of the vehicle 200 to the remote server 270. The remote server 270 can transmit each active entry, such as an entry with a timestamp indicating the time in which the entry was created or last updated that is within a threshold time of the current time to the vehicle 200 or the action determination module 230 and/or each entry that includes a location that is within a threshold distance of the current location of the vehicle 200. The action determination module 230 can receive the entries from the remote server 270 and identify the vehicle characteristics of the vehicles and the identifications of the missing individuals in the entries. The action determination module 230 can store the vehicle characteristics and the identifications of the missing individuals of the different entries in the memory 214.

The action determination module 230 may receive one or more sequences of images from the camera system 220. The action determination module 230 can execute a machine learning model (e.g., a neural network, a support vector machine, a random forest, etc.) to identify or extract different objects and the characteristics of the objects in the sequences of images as features of the sequences of images. The action determination module 230 can identify different vehicles in the sequences of images. For each identified vehicle, the action determination module 230 can determine or identify vehicle characteristics (e.g., make, year, model, color, license plate number, another vehicle identifier, etc.) of the vehicles from the extracted features. The action determination module 230 can compare the vehicle characteristics for the vehicles in the sequences of images with the vehicle characteristics of the entries for the different alerts. Responsive to determining vehicle characteristics of a vehicle depicted in a sequence of images match vehicle characteristics of an alert, the action determination module 230 can execute the kidnapping detection machine learning model to determine if a passenger or human within the vehicle is performing a distressed action.

The action determination module 230 can perform or execute a distress response protocol in response to determining a human within a vehicle is performing a distressed action. The distress response protocol can be or include activating a horn or a lamp on the vehicle 200. In some cases, the distress response protocol can be or include transmitting a message to the remote server 270 indicating a suspected kidnapping. The action determination module 230 can include a current location of the vehicle 200 or the vehicle in which the kidnapped human is located, an identification of the alert that includes the vehicle characteristics based on which the action determination module 230 determined the kidnapping, an identification of the human in the alert, etc. In some cases, the action determination module 230 can include the sequence of images based on which the suspected kidnapping was detected in the message to the remote server 270. The remote server 270 may belong to the authorities or may receive the message and forward the message to a computer of the authorities to review to determine whether to act based on the message and the location of the suspected kidnapping.

FIG. 3 shows execution steps of a processor-based method using the system 250, according to some embodiments. The method 300 shown in FIG. 3 comprises execution steps 302-308. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 3 is described as being performed by a data processing system stored on or otherwise located at a vehicle, such as the autonomy system 250 depicted in FIG. 2. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle.

Using the method 300, the data processing system may automatically determine when other humans perform defined arm gestures. The data processing system can do so using machine learning techniques. For example, the data processing system can receive images or video from different cameras coupled with an autonomous vehicle on which the data processing system is located. The data processing system can receive such images as the autonomous vehicle is moving. The data processing system can identify a sequence of images as a video or as consecutively received images from the same camera. The data processing system can input the sequence of images into a passenger detection machine learning model and execute the passenger detection machine learning model. Based on the execution, the passenger detection machine learning model may output an indication that the sequence of images depicts a human inside another vehicle (e.g., a car, truck, plane, boat, bus, etc.). The data processing system can identify the indication and determine (e.g., based on the indication or by executing another machine learning model using the sequence of images as input) whether the human is performing a defined arm gesture (e.g., a sequence or pattern of extending an arm upward, bending the arm's elbow, and lowering the elbow). Responsive to determining the human is performing the defined arm gesture, the data processing system may activate or honk a horn of the autonomous vehicle. In this way, the data processing system can be an active citizen on the road and better simulate human operation of a vehicle.

For example, at step 302, the data processing system receives a sequence of images. The data processing system can receive the sequence of images from a sensor (e.g., a camera or a video recorder). The data processing system can receive the sequence of images from a camera located, coupled, or positioned around the autonomous vehicle. In some cases, the camera can be a 360-degree camera located on top of (or on another surface of) a tractor of the autonomous vehicle, which may include the tractor and a trailer pulled by the tractor. The data processing system may be stored locally at (e.g., in) the autonomous vehicle or be remote from the autonomous vehicle. The camera may be located at (e.g., on) a surface (e.g., an outer surface) of the autonomous vehicle. The autonomous vehicle can include any number of cameras or other image capturing sensors at the same or different surfaces of the autonomous vehicle, the tractor, or the trailer. Such cameras can be configured to rotate (e.g., rotate 360 degrees) and capture images of the environment surrounding the autonomous vehicle.

The data processing system can receive the sequence of images while the autonomous vehicle is driving or while the autonomous vehicle is stationary. The data processing system can receive the sequence of images over time (e.g., the camera can transmit the images to the data processing system as the camera generates the images). The data processing system can receive the images by polling the camera at set intervals or randomly. In some cases, the camera can transmit the images to the data processing system upon capture, at set time intervals, or randomly.

The data processing system can identify the sequence as consecutively received images that the data processing system receives from the same sensor or camera. For example, as the autonomous vehicle is driving, different cameras can capture images of the surrounding environment of the vehicle and transmit the images to the data processing system. The data processing system can identify the cameras that transmitted the images and label the images based on the cameras that transmitted the images to the data processing system (e.g., if camera A transmits an image to the data processing system, the data processing system can label the image with an identifier that corresponds to camera A). The data processing system can similarly label the images the data processing system receives as the data processing system receives the images. The data processing system can additionally or instead label the images with timestamps indicating when the images were received or generated (e.g., the cameras can include timestamps in the messages that the cameras transmit to the data processing system with the images). The data processing system can store the images and the labels corresponding to the images in memory.

The data processing system can generate a sequence of images as a defined number of consecutively received images from a single camera. For example, as the data processing system receives images from different cameras, the data processing system can identify a defined number of images that have been labeled with the same camera label and that have sequential timestamps. The identified defined number of images can be a sequence of images. In some cases, the data processing system can receive a video from a camera. The received video can be the sequence of images. In some cases, the data processing system can receive a video stream from a camera. The data processing system can generate the sequence of images from the video stream by identifying a video segment having a defined length from the video stream.

At step 304, the data processing system executes a machine learning model (e.g., a first machine learning model). The machine learning model may be a passenger detection machine learning model. The data processing system can execute the passenger detection machine learning model using the sequence of images as input. Execution of the passenger detection machine learning model using the sequence of images as input may cause the passenger detection machine learning model to output an indication of whether a human inside a second vehicle (e.g., a vehicle separate from the autonomous vehicle) is depicted in the sequence of images. For example, the passenger detection machine learning model may include a convolutional neural network configured for object detection and classification from images. The passenger detection machine learning model may be trained or configured to detect humans inside vehicles or in the surrounding vehicles in one or more images using such object detection and classification. The passenger detection machine learning model may be trained to output indications (e.g., binary indications) of whether a human inside a vehicle is depicted in one or more images. In some cases, the passenger detection machine learning model may output a negative indication or a zero in response to a sequence of images that includes a human and a vehicle, but the human is not inside the vehicle. In some cases, the passenger detection machine learning model can be trained to output a positive indication (e.g., a one) in response to processing a sequence of images that includes a human inside a vehicle. The data processing system may execute the passenger detection machine learning model using the sequence of images received from the camera as input and the passenger detection machine learning model may output an indication indicating that a human inside a second vehicle is depicted in the sequence of images.

The passenger detection machine learning model may be trained in different configurations. For example, the passenger detection machine learning model may be trained to output indications of whether a human is depicted in a sequence of images, a human and a vehicle are depicted in a sequence of images, or a human inside a vehicle is depicted within a sequence of images. The training may be specific to identifying humans in different vehicles from the vehicles on which the cameras are located (e.g., the training may not include imagery of images of humans inside a vehicle captured by cameras inside or located on the same vehicle) because such images may not correspond to honking a horn when an individual inside performs a defined arm gesture.

The passenger detection machine learning model may be trained at a remote computer. For example, the remote computer can receive a plurality of training images that may or may not depict a human inside another vehicle. The remote computer can input the training images (e.g., individually or as a sequence having a defined number (e.g., one or more) training images) into the passenger detection machine learning model and execute the passenger detection machine learning model. The passenger detection machine learning model can output indications of whether the training images depict or do not depict a human inside another vehicle. The training images may be labeled with the ground truth. The remote computer can use a loss function and backpropagation techniques to train the passenger detection machine learning model based on the outputs and corresponding ground truths for the individual images. The remote computer can similarly train the passenger detection machine learning model to output indications for sequences of multiple images with ground truths indicating the sequence depicts a human in a second vehicle in a defined number (e.g., one or another defined number) of images of the sequence. The remote computer can deploy or transmit (e.g., in a binary file) the passenger detection machine learning model to the data processing system of the autonomous vehicle responsive to determining the passenger detection machine learning model is trained to an accuracy threshold. The passenger detection machine learning model can be similarly trained to output indications of whether a human is depicted in an image or whether both a human and a vehicle are depicted in an image.

The data processing system may determine whether the human is depicted in the second vehicle based on multiple indications that the passenger detection machine learning model outputs based on the sequence of images. For example, the data processing system can execute the passenger detection machine learning model separately for each image of the sequence of images that the data processing system receives from the camera. Each execution using an image as input can cause the passenger detection machine learning model to output an indication of whether a human inside the second vehicle is depicted in the image. The data processing system can identify the indications for the sequence of images and compare the indications to a condition. For example, the data processing system can calculate a number of indications that indicate an image depicts a human in a second vehicle from the sequence. The data processing system can compare the number of indications to a threshold (e.g., a count threshold). Responsive to determining the number of indications exceeds the threshold, the data processing system can determine a human inside a second vehicle is depicted in the sequence of images. In another example, the data processing system can determine a percentage of the indications for the sequence that indicate a human in a second vehicle is depicted in the sequence of images. The data processing system can compare the percentage to a threshold (e.g., a percentage threshold). Responsive to determining the percentage exceeds the threshold, the data processing system can determine a human inside a second vehicle is depicted in the sequence of images. The data processing system can use any such conditions to determine whether a human inside a second vehicle is depicted inside the sequence of images. By doing so, the data processing system can ensure there are enough images that depict the human inside the second vehicle to determine whether the human is performing a defined arm gesture.

At step 306, the data processing system determines the human is depicted performing the defined arm gesture within the sequence of images. The data processing system can determine the human is depicted performing the defined arm gesture based on or responsive to determining the human inside the second vehicle is depicted in the sequence of images. For example, the passenger detection machine learning model may output an indication that the sequence of images depicts the human inside the second vehicle. The data processing system may determine the sequence of images depicts the human inside the second vehicle based on the indication. Responsive to determining the sequence of images depicts the human inside the second vehicle, the data processing system may execute a gesture detection machine learning model using the sequence of images (e.g., the same sequence of images) as input. The gesture detection machine learning model can be configured or trained to determine whether individual sequences of images depict a human (e.g., a human inside a second vehicle) performing a defined arm gesture. The defined arm gesture can be or include a defined pattern of movement, such as the following steps: raising and extending an arm up in the air, bending the arm's elbow, and bringing the forearm of the arm down in a vertical motion. The gesture detection machine learning model may be configured to output indications (e.g., binary indications) of whether sequences of images include the defined arm gesture or not. The data processing system can execute the gesture detection machine learning model using the sequence of images as input and determine the sequence of images depicts the human in the second vehicle performing the defined arm gesture based on an output of the gesture detection machine learning model indicating the sequence of images depicts a human performing the defined arm gesture.

The gesture detection machine learning model may be trained at a remote computer. For example, the remote computer can receive a plurality of training sequences of images that may or may not depict a human performing the defined arm gesture. The remote computer can input the training sequences of images into the gesture detection machine learning model and execute the gesture detection machine learning model. The gesture detection machine learning model can output indications of whether the training sequences of images depict or do not depict a human inside another vehicle performing the defined arm gesture. The sequences of training images may be labeled with the ground truth. The remote computer can use a loss function and backpropagation techniques to train the gesture detection machine learning model based on the outputs and the ground truths for the respective sequences of images. The remote computer can deploy or transmit (e.g., in a binary file) the gesture detection machine learning model to the autonomous vehicle responsive to determining the gesture detection machine learning model is trained to an accuracy threshold.

In another example, the passenger detection machine learning model can be trained to output indications of whether a sequence of images depicts a human inside a second vehicle performing the defined arm gesture. For example, instead of using the gesture detection machine learning model or first executing the passenger detection machine learning model at step 304 to determine whether a human inside a second vehicle is depicted in the sequence of images, the data processing system may execute the passenger detection machine learning model using the sequence of images as input to determine a human inside a second vehicle performing the defined arm gesture is depicted in the sequence of images. The passenger detection machine learning model may output an indication indicating the sequence of images depicts a human inside a second vehicle performing the defined arm gesture. The data processing system may determine the sequence of images depicts a human inside a second vehicle performing the defined arm gesture based on the indication from the passenger detection machine learning model.

The passenger detection machine learning model may be trained at a remote computer to output indications of whether sequences of images depict a human in a second vehicle performing the defined arm gesture. For example, the remote computer can receive a plurality of training sequences of images that may or may not depict a human inside a second vehicle performing the defined arm gesture. The remote computer can input the training sequences of images into the passenger detection machine learning model and execute the passenger detection machine learning model. The passenger detection machine learning model can output indications of whether the training sequences of images depict or do not depict a human inside another vehicle performing the defined arm gesture. The sequences of training images may be labeled with the ground truth. The remote computer can use a loss function and backpropagation techniques to train the passenger detection machine learning model based on the outputs and the ground truths for the respective sequences of images. The remote computer can deploy or transmit (e.g., in a binary file) the passenger detection machine learning model to the autonomous vehicle responsive to determining the passenger detection machine learning model is trained to an accuracy threshold.

At step 308, the data processing system activates (e.g., honks) a horn of the autonomous vehicle. The data processing system can activate the horn of the autonomous vehicle responsive to determining that the human inside the second vehicle is depicted performing the defined arm gesture in the sequence of images. In some cases, the data processing system can be a separate computing device or execute separate software or instructions from the computer or controller that controls the autonomous vehicle. In such cases, the data processing system can transmit an indication to activate the horn to the controller controlling the autonomous vehicle. The controller can receive the indication and activate or honk the horn responsive to receiving the indication. In this way, the autonomous vehicle can operate to simulate actions that are typically performed by truck drivers being good citizens driving on the road.

The autonomous vehicle can determine to activate the horn based on sequences from any number of sensors (e.g., cameras) of the autonomous vehicle. For example, the autonomous vehicle can include a second sensor (e.g., second camera) mounted to the tractor of the autonomous vehicle. The sensors on the tractor may be located at different locations (e.g., located on different surfaces or at different locations on the same surface) of the autonomous vehicle. The second sensor can transmit a sequence of images to the data processing system. The data processing system can execute the passenger detection machine learning model using the second sequence of images as input to detect a second human inside a third vehicle depicted within the second sequence of images. The data processing system can determine the second human is depicted performing the defined arm gesture within the second sequence of images. The data processing system can activate the horn responsive to the determination that the second human is depicted performing the defined arm gesture within the second sequence of images. The data processing system can similarly process images captured by any number of sensors.

The data processing system can similarly process sequences of images from the different sensors of the autonomous vehicle over time. For example, after determining whether the sequence of images depicts a human inside a second vehicle for the sequence and performing the method 300, the data processing system may receive a new or a second sequence of images from the same or a different camera or sensor of the autonomous vehicle. The data processing system can repeat the method 300 with the second sequence of images. The sequences can include overlapping images from the previously processed sequence of images from the same camera or may be the next sequence of images that the camera or sensor transmits to the data processing system provides.

Figure 4A:
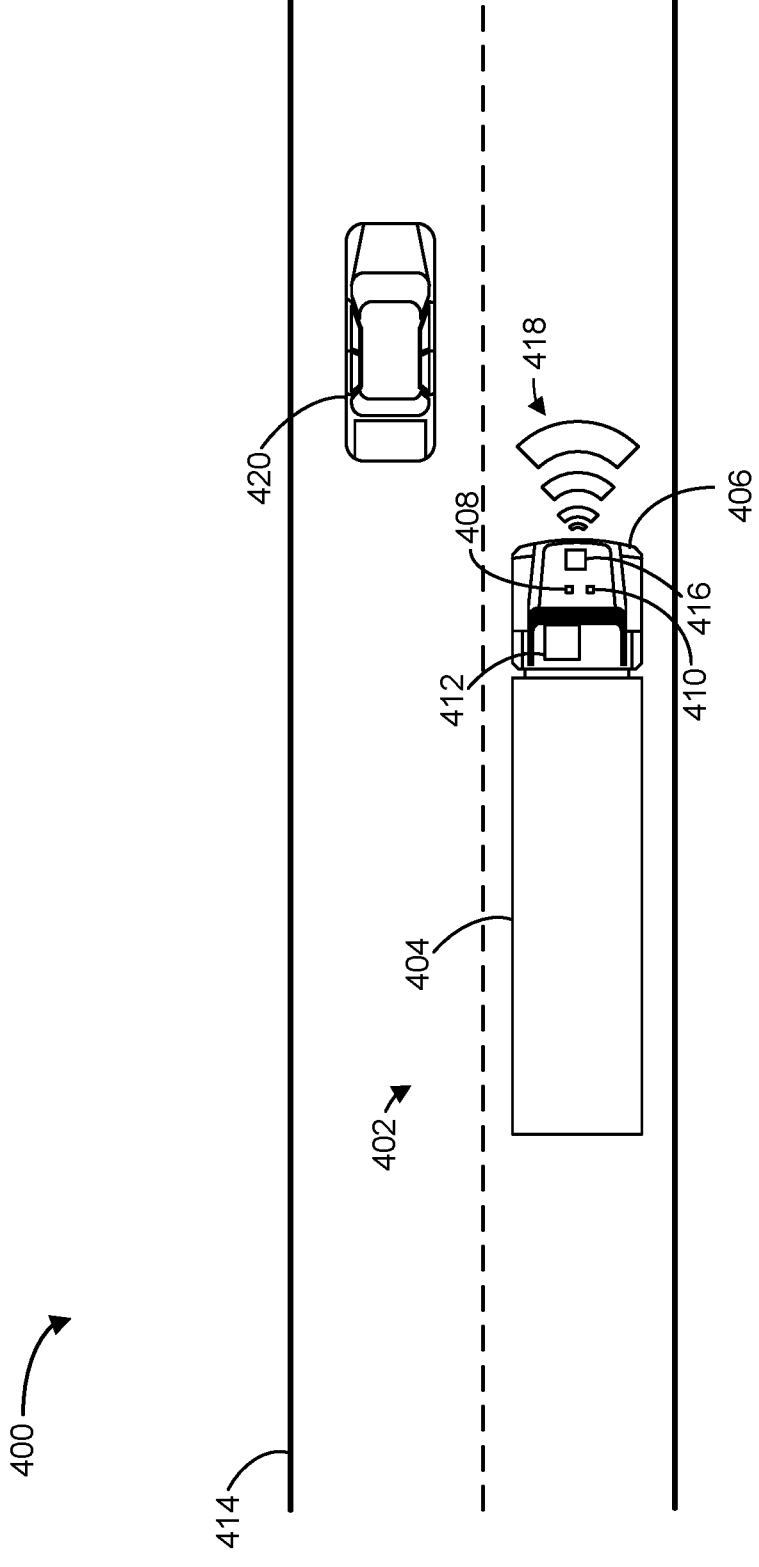
FIG. 4A depicts a bird's-eye view of a roadway scenario of autonomous horn activation, according to an embodi-ment.

FIG. 4A depicts a bird's-eye view of a roadway scenario of autonomous horn activation, according to an embodiment. FIG. 4A illustrates an environment 400 that includes a vehicle 402. The vehicle 402 can be the same as or similar to the vehicle 102. The vehicle 402 can include a trailer 404 and a tractor 406. The vehicle 402 can include sensors 408 and 410. The sensors 408 and 410 can be coupled with or otherwise located on the tractor 406. The sensors 408 and 410 can be sensors of the perception system of the vehicle 102 or cameras of the camera system 220. The vehicle can include any number of sensors similar to the sensors 408 and 410. The vehicle 402 can include a data processing system 412. The data processing system 412 can include one or more processors and memory. The data processing system 412 can be the same as or similar to the autonomy system 250, as described with reference to FIG. 2. The data processing system 412 can be located in or on the tractor 406.

One or more of the sensors 408 and 410 can generate images of the environment surrounding the vehicle 402. The one or more sensors 408 and 410 can do so as the vehicle 402 travels down a road 414 and/or while the vehicle 402 is stationary. The sensors 408 and 410 can transmit the images to the data processing system 412. The data processing system 412 can receive the images and process the images to determine whether individual sequences of the images depict a human in a second vehicle performing a defined arm gesture. Responsive to determining a sequence of images depicts a human in a second vehicle performing the defined arm gesture, the data processing system can activate a horn 416 to cause the horn 416 to emit a sound 418.

Figure 4B:
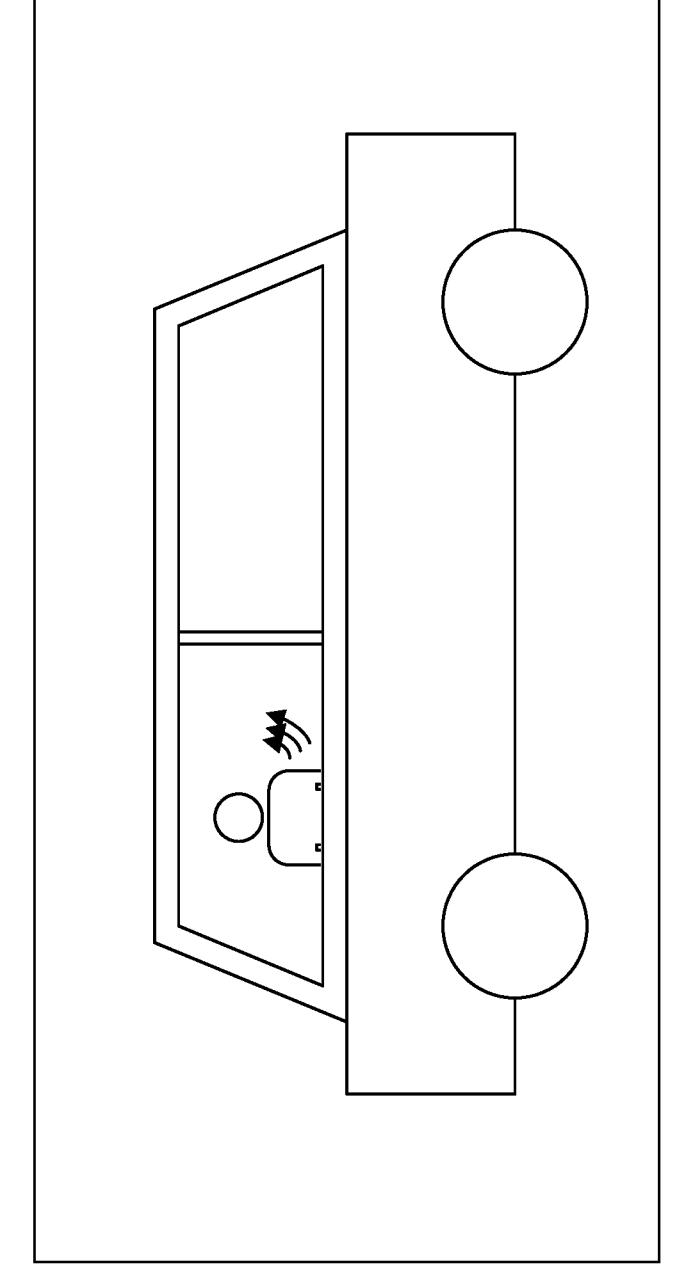
FIG. 4B depicts an example image of an individual performing an arm gesture, according to an embodiment.

For example, the sensor 408 can transmit images to the data processing system 412 of a vehicle 420 over time. The data processing system 412 can receive the images and identify a sequence of images from the received images from the sensor 408. The data processing system 412 can execute one or multiple machine learning models to determine whether the images depict a human inside the vehicle 420 and/or whether the human is performing a defined arm gesture. Responsive to determining a human inside the vehicle 420 is depicted in the sequence of images performing the defined arm gesture, the data processing system 412 can activate the horn 416. An example of an image of the human inside the vehicle 420 performing the defined arm gesture with a representation of the arm gesture movement is shown in FIG. 4B as image 422. The data processing system can similarly activate the horn 416 responsive to determining a sequence of images from the sensor 410 depicts a human in another vehicle performing the defined arm gesture.

FIG. 5 shows execution steps of a processor-based method using the system 250, according to some embodiments. The method 500 shown in FIG. 5 comprises execution steps 502-510. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 5 is described as being performed by a data processing system stored on or otherwise located at a vehicle, such as the autonomy system 250 depicted in FIG. 2. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle.

Using the method 500, the data processing system may automatically detect potential kidnapping victims in cars in the environment surrounding the vehicle. The data processing system can do so using machine learning techniques. For example, a data processing system can receive images or video from different cameras coupled with an autonomous vehicle on which the data processing system is located. The data processing system can receive such images as the autonomous vehicle is moving. The data processing system can identify a sequence of images as a video or as consecutively received images from the same camera. The data processing system can input the sequence of images into a kidnapping detection machine learning model and execute the kidnapping detection machine learning model. Based on the execution, the kidnapping detection machine learning model may output an indication of whether the sequence of images depicts a human inside another vehicle performing a distressed action. The data processing system can identify the indication and determine whether a human inside another vehicle is performing a distressed action (e.g., a sequence or pattern corresponding to a struggle or to one or more actions associated with a kidnapped individual). Responsive to determining the human is performing the distressed action, the data processing system may activate a distress response protocol.

For example, at step 502, the data processing system detects an alert. The alert can be an amber alert, a silver alert, or any other type of alert. The alert can indicate one or more vehicle characteristics (e.g., make, year, model, color, license plate number, another vehicle identifier, etc.). The data processing system can identify the one or more vehicle characteristics from the alert.

The data processing system can detect the alert by querying a database of a remote computing device. For example, the data processing system can transmit a request in a message to a remote computing device for one or more alerts. In some cases, the data processing system can determine the current location of the autonomous vehicle, such as based on GPS data collected by the autonomous vehicle, and include the current location of the autonomous vehicle in the request. The remote computing device can receive the request a query a database in memory for alerts to send to the autonomous vehicle in response to the request.

The database at the remote computing device can include one or more entries that each correspond to a different alert. Each entry can include an identification of a missing individual and a location in which the missing individual was last seen. In some cases, one or more of the entries can include one or more characteristics of a vehicle (e.g., make, year, model, color, license plate number, another vehicle identifier, etc.) that the individual was last seen in or near, etc. The individual entries can also include one or more timestamps indicating a time of the alert of the entry and/or a time that the missing person of the entry was last seen.

The remote computing device can receive the request from the data processing system and query the database. In doing so, the remote computing device may identify entries that are not "stale." For example, the remote computing device may identify entries that correspond to a timestamp (e.g., a timestamp indicating the time of the alert itself or the time at which the individual of the alert was last seen) within a time threshold of the current time. The remote computing device may retrieve data from any entries (e.g., the entries themselves) with such timestamps and transmit the data to the data processing system. In some cases, the remote computing device may only identify entries that correspond to a location (e.g., the location in which the individual of the alert was last seen) that is within a distance threshold of the autonomous vehicle or the data processing system. The remote computing device may retrieve data from any entries (e.g., the entries themselves) that correspond to such locations and, in some cases, that are not stale, and transmit the data to the data processing system.

The data processing system may receive the data of the entries from the remote computing device. The data processing system can generate and store a record (e.g., a file, document, table, listing, message, notification, etc.) in memory for each of the entries for alerts that the data processing system received from the remote computing device. In doing so, the data processing can store the one or more vehicle characteristics of the entries and/or the identifications of the missing individuals.

At step 504, the data processing system receives a sequence of images. The data processing system can receive the sequence of images from a sensor (e.g., a camera or a video recorder). The data processing system can receive the sequence of images from a camera located, coupled, or positioned around the autonomous vehicle. In some cases, the camera can be a 360-degree camera located on top of (or on another surface of) a tractor of the autonomous vehicle, which may include the tractor and a trailer pulled by the tractor. The data processing system may be stored locally at (e.g., in) the autonomous vehicle or be remote from the autonomous vehicle. The camera may be located at (e.g., on) a surface (e.g., an outer surface) of the autonomous vehicle. The autonomous vehicle can include any number of cameras or other image capturing sensors at the same or different surfaces of the autonomous vehicle, the tractor, or the trailer. Such cameras can be configured to rotate (e.g., rotate 360 degrees) and capture images of the environment surrounding the autonomous vehicle. The data processing system can receive and identify the sequence of images in the same or a similar manner to the manner described with reference to step 302 of FIG. 3.

At step 506, the data processing system determines whether a second vehicle depicted within the sequence of images has one or more vehicle characteristics of an alert. For example, the data processing system can extract features from the sequence of images. The data processing system can do so, for example, by executing a machine learning model (e.g., a neural network, such as a convolutional neural network) using the images of the sequence as input. The machine learning model may be a feature extraction machine learning model. The feature extraction machine learning model may output different features (e.g., objects within the images, the scenery, colors within the images, etc.) of the images based on the execution. In one example, the feature extraction machine learning model may output characteristics of different objects within the images as features, such as vehicle characteristics of any vehicles in the images. The data processing system may identify the different features output by the feature extraction machine learning model to determine whether any vehicles are depicted in the sequence of images (e.g., whether the feature extraction machine learning model extracted a vehicle object feature from the sequence of images). The data processing system may identify a vehicle object feature from the extracted features. Responsive to identifying the vehicle object feature from the extracted features, the data processing system may identify vehicle characteristics of the vehicle object for a second vehicle depicted in the sequence of images.

The data processing system can compare the vehicle characteristics identified from the sequence of images to vehicle characteristics in entries that the data processing system has stored in memory. The data processing system can compare the vehicle characteristics identified from the sequence of images to each entry in memory to determine if a condition is satisfied. For example, the data processing system can determine the vehicle characteristics identified from the sequence of images match vehicle characteristics from an entry stored in memory responsive to the vehicle characteristics identified from the sequence of images including each of the vehicle characteristics from the entry. In another example, the data processing system can determine the vehicle characteristics identified from the sequence of images match vehicle characteristics from an entry stored in memory responsive to determining the vehicle characteristics identified from the sequence of images match a defined subset (e.g., the license plate number or another vehicle identifier, make and model, model and year, or any defined permutation or combination) of the vehicle characteristics from the entry. In doing so, the data processing system can determine the second vehicle depicted within the sequence of images matches an entry responsive to determining a condition is satisfied. In some cases, responsive to determining the second vehicle depicted within the sequence of images matches an entry, the data processing system can transmit a message to a remote server or computing device indicating the match, the current location of the vehicle, and/or the entry (e.g., any data from the entry) that corresponds to the match.

Responsive to the determination that the second vehicle depicted within the sequence of images has the one or more vehicle characteristics (e.g., the second vehicle has one or more vehicle characteristics that match vehicle characteristics of the entry to satisfy a condition), at step 508, the data processing system can execute a machine learning model. The machine learning model can be a kidnapping detection machine learning model. The kidnapping detection machine learning model can be trained or configured to determine whether a human inside another vehicle is performing a distressed action. A distressed action can be an action that corresponds to an action associated with a kidnapped individual. For example, a distressed action can be or include an individual struggling against another individual, an individual waving their arms, an individual with their arms bound behind their back, an individual with tape over their mouths, etc. The data processing system can execute the kidnapping detection machine learning model using the sequence of images as input. Based on the execution, the kidnapping detection machine learning model can output an indication (e.g., a binary indication) of whether the sequence of images depicts a human inside the second vehicle performing the distressed action. The data processing system can determine a human inside the second vehicle is performing the distressed action based on a positive indication from the kidnapping detection machine learning model.

The kidnapping detection machine learning model may be trained at a remote computer. For example, the remote computer can receive a plurality of training sequences of images that may or may not depict a human performing distressed actions, such as the distressed actions mentioned above, that correspond with a kidnapped individual. The remote computer can input the training sequences of images into the kidnapping detection machine learning model and execute the kidnapping detection machine learning model. The kidnapping detection machine learning model can output indications of whether the training sequences of images depict or do not depict a human inside another vehicle performing the distressed action. The sequences of training images may be labeled with the ground truth. The remote computer can use a loss function and backpropagation techniques to train the kidnapping detection machine learning model based on the outputs and the ground truths for the respective sequences of images. The remote computer can deploy or transmit (e.g., in a binary file) the kidnapping detection machine learning model to the autonomous vehicle responsive to determining the kidnapping detection machine learning model is trained to an accuracy threshold.

At step 510, the data processing system activates a distress response protocol. The data processing system can activate the distress response protocol responsive to the determination that the human inside the second vehicle is performing the distressed action. The distress response protocol can be or include transmitting, via a network interface of the autonomous vehicle, a message to a remote computing device. In executing the distress response protocol, the data processing system can retrieve the data (e.g., an identification of the missing individual, the characteristics of the vehicle that the missing individual was last seen near, or any other characteristics) of the entry from memory with vehicle characteristics that match the vehicle characteristics of the second vehicle. The data processing system can include the retrieved data in the message to the remote computing device. In some cases, the data processing system can identify the current location of the autonomous vehicle based on GPS data and include the current location in the message instead of or in addition to the data retrieved from the entry. In some cases, the data processing system can include the sequence of images based on which the suspected kidnapping was detected in the message to the remote computing device. The data processing system can transmit the message to the remote computing device to alert the authorities of the sighting of the kidnapped individual and/or the location of the sighting.

The data processing system can similarly process sequences of images from the different sensors of the autonomous vehicle over time. For example, after determining whether the sequence of images depicts a human inside a second vehicle for the sequence and performing the method 500, the data processing system may receive a new or a second sequence of images from the same or a different camera or sensor of the autonomous vehicle. The data processing system can repeat the method 500 with the second sequence of images. The sequences can include overlapping images from the previously processed sequence of images from the same camera or may be the next sequence of images that the camera or sensor transmits to the data processing system provides.

The autonomous vehicle can determine to monitor the environment for kidnapped individuals based on sequences from any number of sensors (e.g., cameras) of the autonomous vehicle. For example, the autonomous vehicle can include a second sensor (e.g., second camera) mounted to the tractor of the autonomous vehicle. The sensors on the tractor may be located at different locations (e.g., located on different surfaces) of the autonomous vehicle. The second sensor can transmit a second sequence of images to the data processing system. The data processing system can detect a third vehicle depicted within the second sequence of images. The data processing system can determine the third vehicle has vehicle characteristics that match vehicle characteristics of another entry for another alert in memory to satisfy a condition. Responsive to the determination that the third vehicle depicted within the second sequence of images has the second one or more vehicle characteristics or otherwise vehicle characteristics that satisfy a condition, the data processing system can execute the kidnapping detection machine learning model using the second sequence of images as input. The kidnapping detection machine learning model may output an indication that the second sequence of images does not depict a second human associated with the third vehicle performing the distressed action. The data processing system may determine the third vehicle does not include a kidnapped individual based on the indication. Responsive to the determination that the second sequence of image does not depict an individual performing a distressed action in the third vehicle, the data processing system can discard the second sequence of images without activating the distress response protocol.

In some cases, the data processing system may not use processing resources to determine whether vehicles detected within a sequence of images have vehicle characteristics that match vehicle characteristics of an alert. For example, subsequent to extracting features from a sequence of images, the data processing system can identify a location of an alert from an entry in memory. The data processing system can identify the current location of the autonomous vehicle. The data processing system may determine a distance between the two locations, such as by using a distance formula. The data processing system can compare the distance to a threshold (e.g., a distance threshold). Responsive to determining the distance is less than the threshold, the data processing system can compare the extracted features from the sequence of images to the vehicle characteristics of the alert. However, responsive to determining the distance is greater than the threshold, the data processing system may not compare the features of the sequence of images to the vehicle characteristics of the alert. In another example, the vehicle may discard data regarding alerts from the remote computing device of alerts that correspond to a distance that is over a distance threshold away from the autonomous vehicle. In this way, the data processing system may reduce the processing resources of performing the method 500 by only comparing the features of the sequence of images to vehicle characteristics of alerts that are close to the vehicle and therefore more likely to be relevant.

Figure 6A:
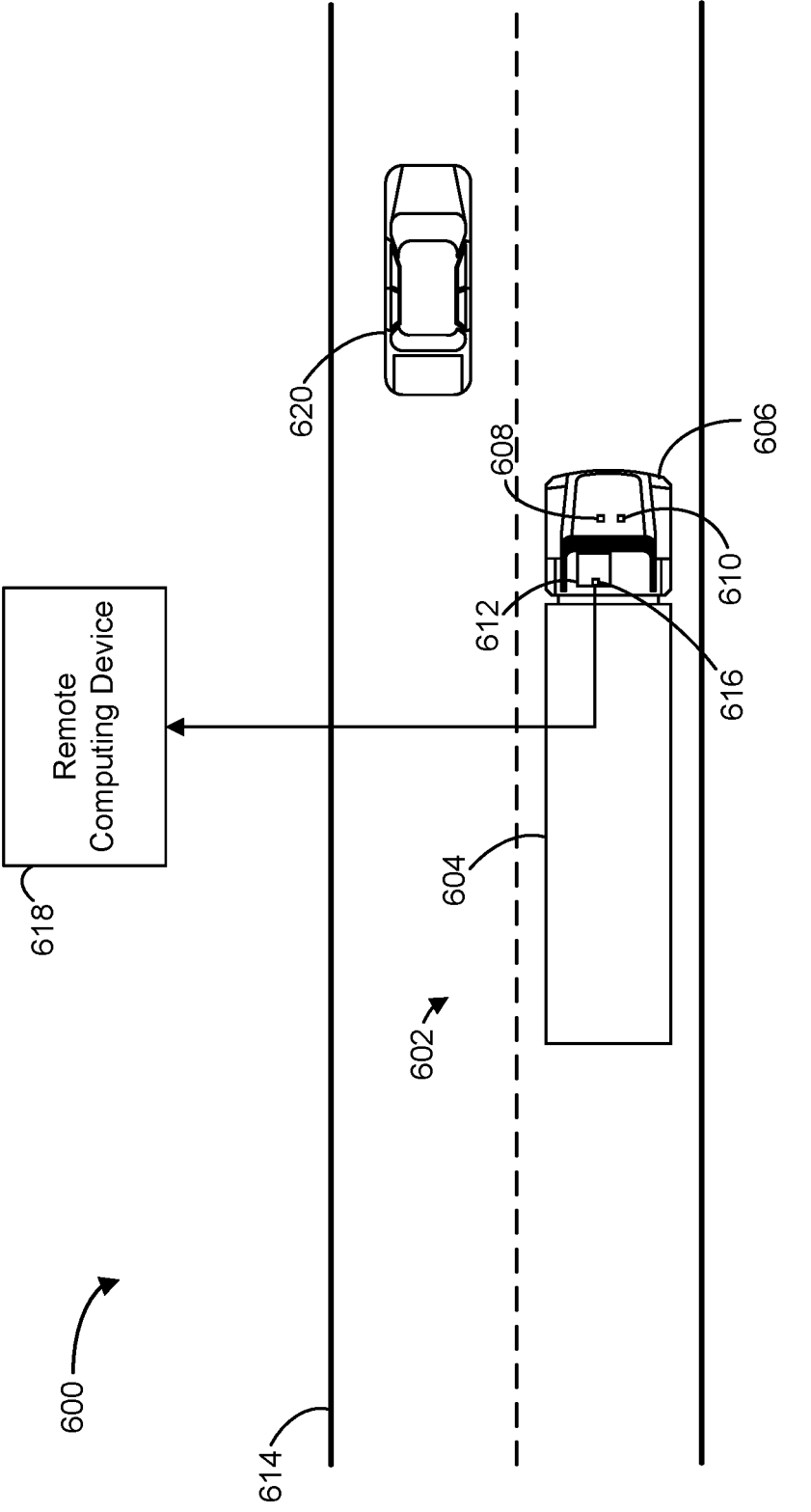
FIG. 6A depicts a bird's-eye view of a roadway scenario of detecting a kidnapping scenario, according to an embodi-ment.

FIG. 6A depicts a bird's-eye view of a roadway scenario of detecting a kidnapping scenario, according to an embodiment. FIG. 6A illustrates an environment 600 that includes a vehicle 602. The vehicle 602 can be the same as or similar to the vehicle 102. The vehicle 602 can include a trailer 604 and a tractor 606. The vehicle 602 can include sensors 608 and 610. The sensors 608 and 610 can be coupled with or otherwise located on the tractor 606. The sensors 608 and 610 can be sensors of the perception system of the vehicle 102 or cameras of the camera system 220. The vehicle can include any number of sensors similar to the sensors 608 and 610. The vehicle 602 can include a data processing system 612. The data processing system 612 can include one or more processors and memory. The data processing system 612 can be the same as or similar to the autonomy system 250, as described with reference to FIG. 2. The data processing system 612 can be located in or on the tractor 606.

One or more of the sensors 608 and 610 can generate images of the environment surrounding the vehicle 602. The one or more sensors 608 and 610 can do so as the vehicle 602 travels down a road 614 and/or while the vehicle 602 is stationary. The sensors 608 and 610 can transmit the images to the data processing system 612. The data processing system 612 can receive the images, process the images to determine whether individual sequences of the images depict a human in a second vehicle performing a distressed action. Responsive to determining a sequence of images depicts a human in a second vehicle performing a distressed action, the data processing system can transmit, via a network interface 616, a message to a remote computing device 618.

For example, the remote computing device 618 can maintain a database with different entries for alerts for missing individuals that have been established. The data processing system 612 can query the remote computing device 618 for different alerts or entries for alerts. The remote computing device 618 can transmit data for the different entries to the vehicle 602 in response to the query. The data processing system 612 can receive the data and store the data in memory in a separate record for each of the entries.

The sensor 608 can transmit images to the data processing system 612 of a vehicle 620 over time. The data processing system 612 can receive the images and identify a sequence of images from the received images from the sensor 608. The data processing system 612 can execute a feature extraction machine learning model on the sequence of images to extract features from the images. At least a portion of the extracted features can be or include vehicle characteristics of the vehicle 620. The data processing system 612 can compare the vehicle characteristics of the vehicle 620 with the vehicle characteristics of the different records stored in memory. The data processing system 612 identify a record that corresponds to an alert that is relevant or otherwise corresponds to the vehicle 620 responsive to determining the vehicle characteristics of the vehicle 620 match or otherwise satisfy a condition based on a comparison with a record stored in memory of the data processing system.

Figure 6B:
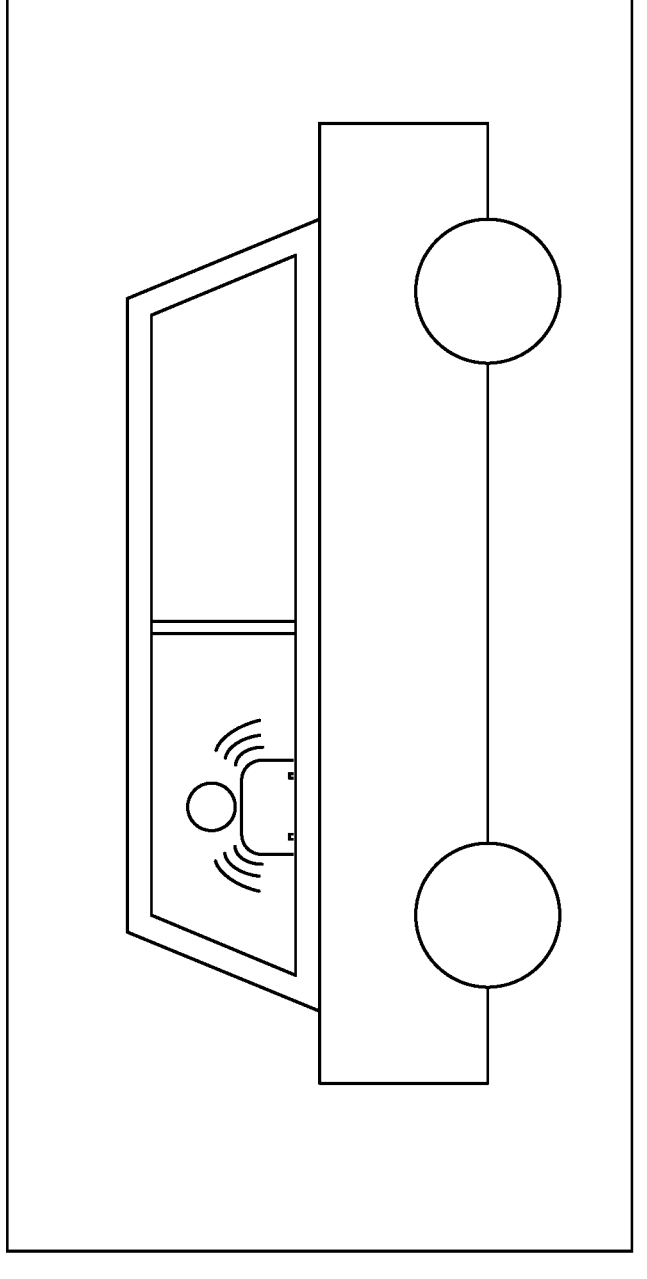
FIG. 6B depicts an example image of an individual performing a distressed action, according to an embodiment.

Responsive to determining the vehicle characteristics of the vehicle 620 match the vehicle characteristics of an alert, the data processing system 612 can determine whether the images depict a human inside the vehicle 620 performing a distressed action. The data processing system may do so, for example, by inputting the sequence of images into a kidnapping detection machine learning model trained or configured to determine whether a human inside another vehicle is performing a distressed action. An example of an image of the human inside the vehicle 620 performing the distressed with a representation of the distressed action is shown in FIG. 6B as image 622. Based on the execution, the kidnapping detection machine learning model may output an indication that the sequence of images depicting the vehicle 620 depict a human inside the vehicle 620 performing the distressed action. The data processing system may identify the indication to determine a human inside the vehicle 620 is depicted in the sequence of images performing the distressed action.

Responsive to determining a human inside the vehicle 620 is depicted in the sequence of images performing the distressed action, the data processing system 612 can activate a distress response protocol. The data processing system may do so, for example, by transmitting a message to the remote computing device 618 that includes a current location of the vehicle 602 and/or an identification of a missing individual, or any other data, of the alert based on which the data processing system 612 determined a human in the vehicle 620 is depicted in the sequence of images performing the distressed action. The data processing system 612 may transmit the message through the network interface 616. The data processing system 612 can similarly activate the distress response protocol responsive to determining a sequence of images from the sensor 610 depicts a human in another vehicle with vehicle characteristics that match an alert performing the distressed action.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An autonomous vehicle, comprising:
a sensor configured to capture images; and
one or more processors configured to:
    detect an alert indicating one or more vehicle characteristics;
    receive a sequence of images from the sensor;
    determine a second vehicle depicted within the sequence of images has the one or more vehicle characteristics included within the alert;
    responsive to the determination that the second vehicle depicted within the sequence of images has the one or more vehicle characteristics, execute a machine learning model using the sequence of images as input to determine a human inside the second vehicle is performing a distressed action; and
    activate a distress response protocol responsive to the determination that the human inside the second vehicle is performing the distressed action.

2. The autonomous vehicle of claim 1, wherein the one or more processors are configured to detect the alert by:
querying a database stored in a remote computing device, the database configured to store a list of alerts, each alert including an identification of an individual and one or more vehicle characteristics; and
identifying the alert from the database.

3. The autonomous vehicle of claim 2, further comprising:
a network interface configured to communicate with a server,
    wherein the one or more processors are configured to activate the distress response protocol by transmitting, via the network interface, a message comprising the identification of the individual from the alert to a remote computing device.

4. The autonomous vehicle of claim 3, wherein transmitting the message comprises transmitting a current location of the autonomous vehicle to the remote computing device.

5. The autonomous vehicle of claim 1, wherein the one or more processors are configured to detect the alert by receiving the alert from a remote computing device.

6. The autonomous vehicle of claim 1, wherein the one or more processors are configured to determine the second vehicle depicted within the sequence of images has the one or more vehicle characteristics by:
executing a second machine learning model using the sequence of images as input to extract features from the sequence of images; and
determine the second vehicle depicted within the sequence of images has the one or more vehicle characteristics by determining the features satisfy a condition associated with the detected alert.

7. The autonomous vehicle of claim 1, wherein the distressed action corresponds to an action associated with a kidnapped individual.

8. The autonomous vehicle of claim 1, wherein the autonomous vehicle comprises:
a tractor; and
a trailer pulled by the tractor,
    wherein the sensor is mounted to a top surface of the tractor.

9. The autonomous vehicle of claim 8, wherein the sensor is configured to capture images in a 360 degree rotation.

10. The autonomous vehicle of claim 1, wherein the one or more processors are configured to:

detect a second alert indicating second one or more vehicle characteristics;

receive a second sequence of images from the sensor;

determine a third vehicle depicted within the second sequence of images has the second one or more vehicle characteristics;

responsive to the determination that the third vehicle depicted within the second sequence of images has the second one or more vehicle characteristics, execute the machine learning model using the second sequence of images as input to determine the second sequence of images does not depict a second human associated with the third vehicle performing the distressed action; and discard the second sequence of images without activating the distress response protocol responsive to the determination that the second sequence of images does not depict a second human associated with the third vehicle performing the distressed action.

11. The autonomous vehicle of claim 1, wherein the one or more processors are further configured to:

identify a location of the alert;

identify a current location of the autonomous vehicle;

determine a distance between the location of the alert and the current location of the autonomous vehicle; and determine whether the second vehicle depicted with the sequences of images has the one or more characteristics in response to a determination that the distance is less than a threshold.

12. A method, comprising:

detecting, by one or more processors of an autonomous vehicle, an alert indicating one or more vehicle characteristics;

receiving, by the one or more processors of the autonomous vehicle from a sensor of the autonomous vehicle, a sequence of images from the sensor;

determining, by the one or more processors, a second vehicle depicted within the sequence of images has the one or more vehicle characteristics included within the alert;

responsive to the determining that the second vehicle depicted within the sequence of images has the one or more vehicle characteristics, executing, by the one or more processors, a machine learning model using the sequence of images as input to determine a human inside the second vehicle is performing a distressed action; and activating, by the one or more processors, a distress response protocol responsive to the determining that the human inside the second vehicle is performing the distressed action.

13. The method of claim 12, wherein detecting the alert comprises:

querying, by the one or more processors, a database stored in a remote computing device, the database configured to store a list of alerts, each alert including an identification of an individual and one or more vehicle characteristics; and identifying, by the one or more processors, the alert from the database.

14. The method of claim 13, wherein activating the distress response protocol comprises transmitting, by the one or more processors and via a network interface, a message comprising the identification of the individual from the alert to a remote computing device.

15. The method of claim 14, wherein transmitting the message comprises transmitting, by the one or more processors, a current location of the autonomous vehicle to the remote computing device.

16. The method of claim 12, wherein detecting the alert comprises receiving, by the one or more processors, the alert from a remote computing device.

17. The method of claim 12, determining a second vehicle depicted within the sequence of images has the one or more vehicle characteristics comprises:

executing, by the one or more processors, a second machine learning model using the sequence of images as input to extract features from the sequence of images; and determining, by the one or more processors, the second vehicle depicted within the sequence of images has the one or more vehicle characteristics by determining the features satisfy a condition associated with the detected alert.

18. The method of claim 12, wherein the distressed action corresponds to an action associated with a kidnapped individual.

19. The method of claim 12, further comprising:

identifying, by the one or more processors, a location of the alert;

identifying, by the one or more processors, a current location of the autonomous vehicle;

determining, by the one or more processors, a distance between the location of the alert and the current location of the autonomous vehicle; and determining, by the one or more processors, whether the second vehicle depicted with the sequences of images has the one or more characteristics in response to a determination that the distance is less than a threshold.

20. The method of claim 12, wherein the autonomous vehicle comprises:

a tractor; and a trailer pulled by the tractor, wherein the sensor is mounted to a top surface of the tractor.

\* \* \* \* \*